(12) United States Patent
Iwata et al.

(10) Patent No.: US 7,743,679 B2
(45) Date of Patent: Jun. 29, 2010

(54) POWER TRANSMISSION DEVICE AND METHOD OF PRODUCING THE SAME

(75) Inventors: Shigetsugu Iwata, Toyota (JP); Kenji Miyasaka, Toyota (JP); Katsuyuki Hojo, Toyota (JP); Yuichi Nishida, Aichi-gun (JP); Hiroshi Mizoguchi, Okazaki (JP); Naoki Kato, Aichi-gun (JP); Hiroki Goshima, Nukata-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 159 days.

(21) Appl. No.: 11/816,936

(22) PCT Filed: Feb. 22, 2006

(86) PCT No.: PCT/JP2006/303826

§ 371 (c)(1),
(2), (4) Date: Aug. 23, 2007

(87) PCT Pub. No.: WO2006/090893

PCT Pub. Date: Aug. 31, 2006

(65) Prior Publication Data

US 2009/0042655 A1    Feb. 12, 2009

(30) Foreign Application Priority Data

Feb. 25, 2005  (JP) ............................. 2005-051603
Nov. 8, 2005   (JP) ............................. 2005-323730

(51) Int. Cl.
*F16H 55/14* (2006.01)

(52) U.S. Cl. .......................................... 74/443; 29/893

(58) Field of Classification Search ............... 464/78, 464/98; 74/443, 461, DIG. 10; 29/893, 893.3, 29/863.33, 893.36
See application file for complete search history.

(56) References Cited

U.S. PATENT DOCUMENTS

| 4,078,445 A | * | 3/1978 | Kiser, Jr. ................ 74/443 X |
| 4,574,676 A | * | 3/1986 | Jansen-Herfeld |
| 5,885,199 A | * | 3/1999 | Shao |
| 2004/0089122 A1 | * | 5/2004 | Nishio et al. |

FOREIGN PATENT DOCUMENTS

| DE | 42 20 049 A1 | * | 12/1993 | ............... 464/98 |
| FR | 1.111.908 | * | 3/1956 | ............... 464/98 |
| JP | 58 84245 | | 5/1983 | |
| JP | 60 167852 | | 11/1985 | |
| JP | 63 254264 | | 10/1988 | |
| JP | 64 55348 | | 4/1989 | |
| JP | 2 155584 | | 6/1990 | |
| JP | 5 337735 | | 12/1993 | |
| JP | 8 294818 | | 11/1996 | |
| JP | 10 272077 | | 10/1998 | |
| JP | 2000 288834 | | 10/2000 | |
| JP | 2001 116115 | | 4/2001 | |
| JP | 2002 28821 | | 1/2002 | |
| JP | 2003 166015 | | 6/2003 | |

* cited by examiner

*Primary Examiner*—Greg Binda
(74) *Attorney, Agent, or Firm*—Oblon, Spivak, McClelland, Maier & Neustadt, L.L.P.

(57) ABSTRACT

A power transmission device that can have deformation in processing suppressed. A spiral gear as a rotation member includes a disk section extending radially outwards from a boss section. The disk section includes a through hole in slit form through laser processing.

17 Claims, 12 Drawing Sheets

POWER TRANSMISSION DEVICE AND METHOD OF PRODUCING THE SAME

TECHNICAL FIELD

The present invention relates to a power transmission device and a fabrication method thereof. More particularly, the present invention relates to a power transmission device mounted on a vehicle, and a fabrication method of the power transmission device.

BACKGROUND ART

A conventional power transmission device is disclosed in, for example, Japanese Patent Laying-Open No. 2001-116115.

DISCLOSURE OF THE INVENTION

The aforementioned conventional art discloses a gear device having a first gear and a second gear combined to allow relative displacement in the circumferential direction, wherein a flexible arm subject to elastic deformation in accordance with the relative displacement of the first and second gears in the circumferential direction is provided integrally running towards the outer side in the diameter direction from the boss section of the second gear.

It is known that a metal gear generally undergoes fabrication steps in the order of forging, blanking, tooth flank processing, quenching, and tempering in the fabrication stage. In the case where a step of forming an arm section, when employed as set forth above, is performed prior to quenching, distortion during quenching will vary greatly. If this step is performed after quenching, an additional step of working on the hard surface will be required after quenching. There was a problem that processing is rendered difficult.

In view of the foregoing, an object of the present invention is to provide a power transmission device that can prevent noise, and that can have deformation in processing suppressed.

A power transmission device of the present invention is directed to a power transmission device transmitting power from a power source via a rotation member rotating about a predetermined shaft center. The rotation member includes a disk section extending radially outwards from a boss section. A hole in slit form drilled by laser processing is provided at the disk section.

The power transmission device configured as set forth above has a hole in slit form drilled by laser processing. Thus, there can be provided a power transmission device that can have deformation in processing suppressed, and that can prevent noise or vibration.

Preferably, the rotation member is a gear.

Preferably, the power transmission device is a transmission provided in a vehicle, and the rotation member is a rotation member provided in the transmission.

Preferably, the hole in slit form has a C shape. The hole in slit form is configured with a first step of forming a through hole at an end of the slit, a second step of forming a through hole at an other end of the slit, and a third step of forming the slit with the center of area of the through hole formed at the first step as the start point and the center of area of the through hole formed at the second step as the end point.

A fabrication method of a power transmission device according to the present invention is directed to a fabrication method of a power transmission device transmitting power from a power source via a rotation member including a disk section extending radially outwards from a boss section. The fabrication method includes the steps of quenching at least the rotation member, and drilling a hole in slit form at the disk section through laser processing after quenching.

Since a hole in slit form is drilled through laser processing at the disk section after quenching in the fabrication method of a power transmission device configured as set forth above, deformation at the time of processing can be suppressed.

According to the present invention, there can be provided a power transmission device that can have deformation in processing suppressed, and that can prevent generation of noise and/or vibration.

BEST MODES FOR CARRYING OUT THE INVENTION

Embodiments of the present invention will be described hereinafter with reference to the drawings. In the embodiments set forth below, the same or corresponding elements have the same reference characters allotted, and description thereof will not be repeated.

First Embodiment

Figure 1:
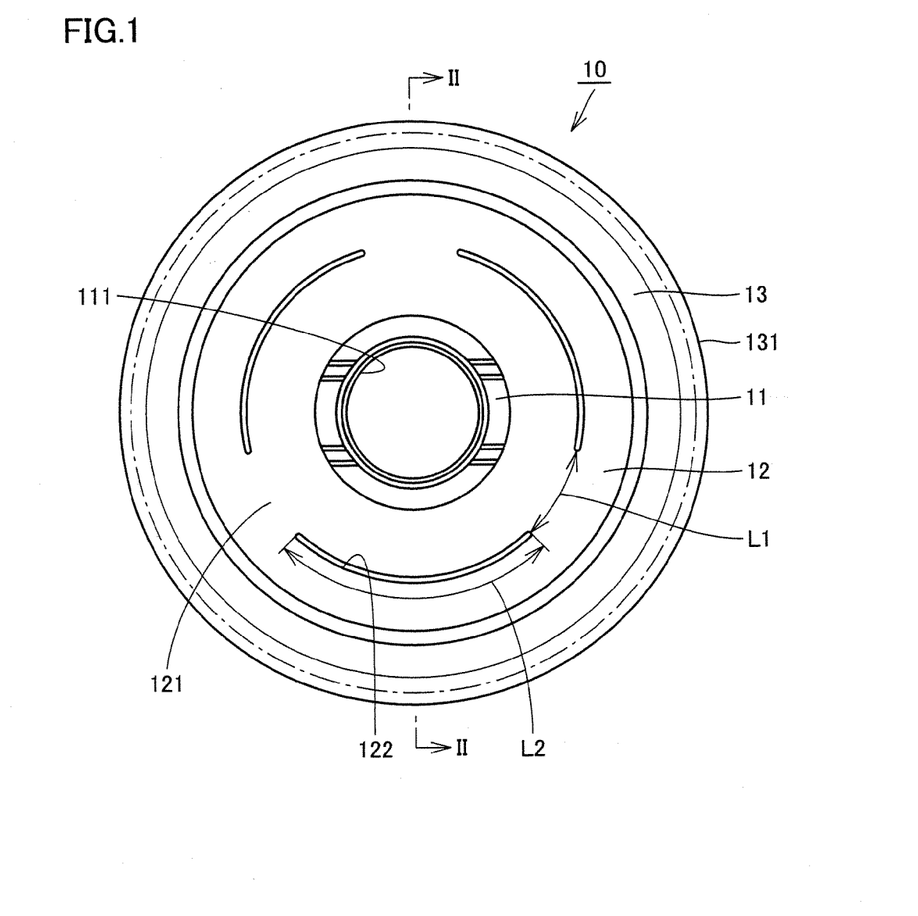
FIG. 1 is a front view of a spiral gear according to a first embodiment of the present invention.
Figure 2:
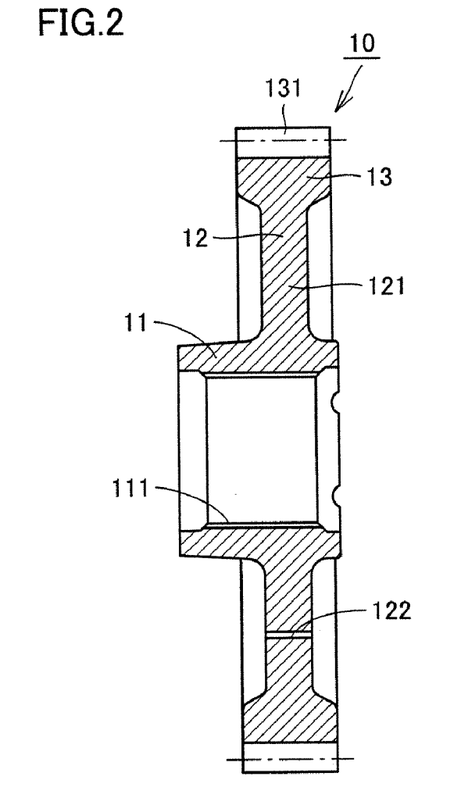
FIG. 2 is a sectional view taken along line II-II of FIG. 1.

FIG. 1 is a front view of a spiral gear according to a first embodiment of the present invention, and FIG. 2 is a sectional view taken along line II-II of FIG. 1.

As shown in FIGS. 1 and 2, a spiral gear 10 according to the first embodiment of the present invention includes a boss section 11, a disk section 12, and a rim section 13. Boss section 11 is formed in a cylindrical configuration with a through hole 111 at the center. A rotational shaft is inserted into through hole 11 for attachment of the boss section to the rotational shaft. Disk section 12 is a thin portion provided to extend outwards from boss section 11 in the radial direction of the rotational shaft. Rim section 13 is located at the outer circumferential edge of disk section 12. The outer circumferential face of rim section 13 is toothed, forming a tooth flank 131.

Disk section 12 includes a plurality of through holes 122 in slit form. The slit extends along the circumferential direction of the rotational shaft. Through hole 122 extends in a direction parallel to the axial direction of the rotational shaft to penetrate disk section 12. In spiral gear 10 of the present embodiment, three through holes 122 are provided, evenly spaced apart in the circumferential direction of the axial direction. A connecting region 121 is located between through holes 122 in the circumferential direction of the rotational shaft. Connecting region 121 connects boss section 111 with rim section 13.

As shown in FIG. 1, spiral gear 10 according to the first embodiment of the present invention has a length L1 of connecting region 121 in the circumferential direction of the rotational shaft set smaller than a length L2 of through hole 122 in the circumferential direction of the rotational shaft. Since three through holes 122 are provided equally spaced apart in the circumferential direction of the rotational shaft in spiral gear 10 of the present invention, length L1 of each through hole 122 in the circumferential direction of the rotational shaft is identical for all the through holes. Furthermore, length L2 of connecting region 121 in the circumferential direction of the rotational shaft is identical.

Figure 3:
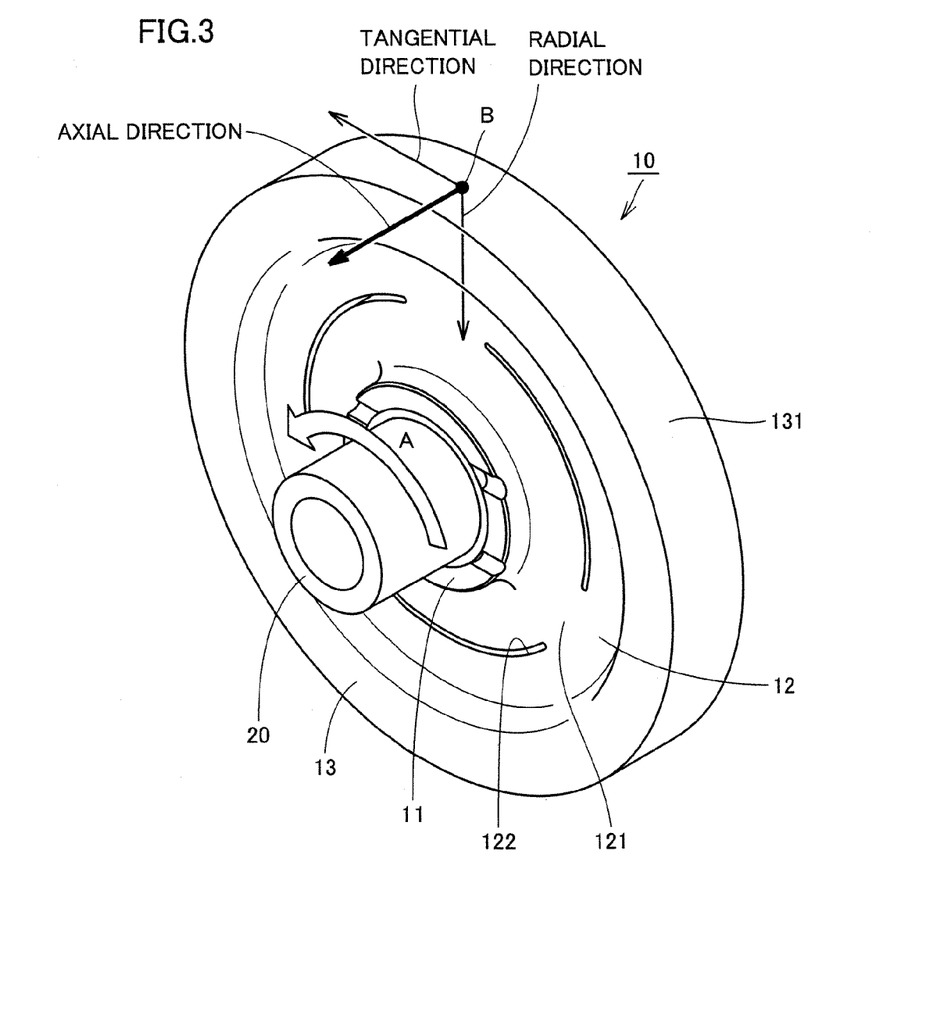
FIG. 3 is a diagram to describe the doctrine of reducing noise generated at a spiral gear.

FIG. 3 is a diagram to describe the doctrine of reducing noise generated at the spiral gear. The mechanism of noise generation will be described with reference to this drawing.

Referring to FIG. 3, consider the case where rotational shaft 20 rotates in the direction indicated by arrow A. When the teeth provided at the outer circumferential face of rim section 13 in spiral gear 10 fitted to rotational shaft 20 engages with the teeth of another spiral gear at point B, a mesh force is exerted on spiral gear 10 at this point B. This mesh force is divided into component forces of three directions, i.e. the tangential component force, the radial component force, and the axial component force, as shown in FIG. 3. The difference lies in that the mesh force is exerted also axially, as compared to the mesh when spur gears engage with each other.

Through hole 122 provided at disk section 12 of spiral gear 10 serves to prevent transmission of the mesh force that can be divided into the three directions to boss section 11 via disk section 12. In other words, the provision of through hole 122 in disk section 12 reduces the rigidity of disk section 12 in the three directions, i.e. the tangential, radial, and axial directions. Accordingly, connecting region 121 bends by elastic deformation to alleviate the transmission of vibration generated at tooth flank 131. Therefore, generation and transmission of vibration can be suppressed effectively. As a result, generation of noise can be reduced.

Particularly, by setting length L1 of connecting region 121 in the circumferential direction of the rotational shaft shorter than length L2 of through hole 122 in the circumferential direction of the rotational shaft, the rigidity of connecting region 121 in the axial direction can be reduced effectively. The proportion of the axial component of the mesh force being transmitted to boss section 11 is reduced to suppress generation and transmission of vibration. Thus, generation of noise is reduced significantly.

Since three through holes 122 are provided spaced substantially evenly apart in the circumferential direction of the rotational shaft, excessive elastic deformation in the circumferential direction of the rotational shaft will not occur. Therefore, the natural mode of vibration will not be excited readily, allowing suppression of vibration and noise generation.

To summarize, spiral gear 10 of the first embodiment is employed as a rotation member rotating about a predetermined shaft center, and the power from a power source is transmitted through this spiral gear. Spiral gear 10 includes a disk section 12 extending radially outwards from boss section 11. Disk section 12 is provided with a through hole 122 in slit form, drilled by laser processing.

Since spiral gear 10 of the above-described configuration has through hole 122 formed by laser processing, deformation in processing can be suppressed as compared to the case where a through hole is formed by means other than by laser processing.

Second Embodiment

Figure 4:
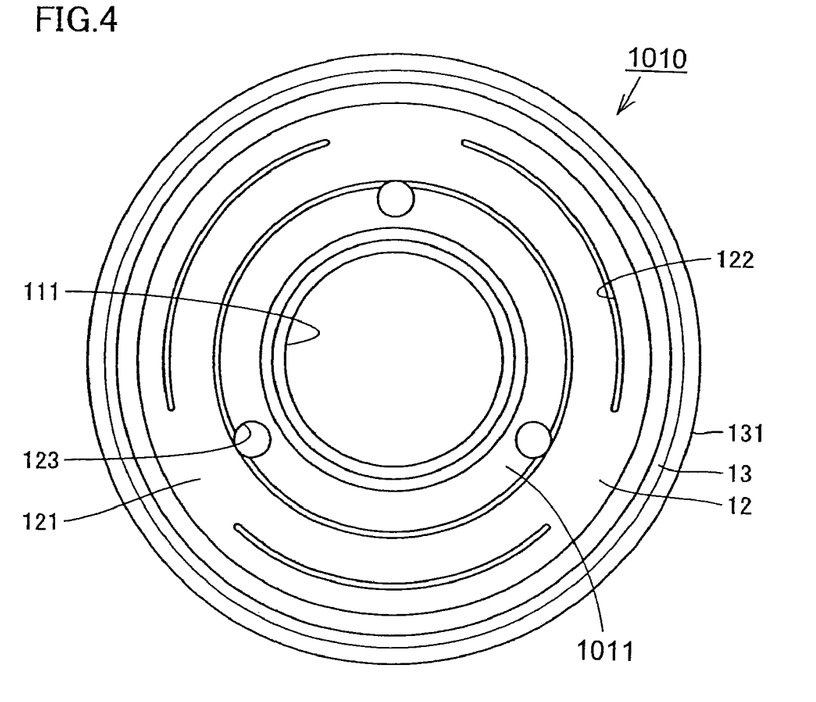
FIG. 4 is a front view of a spiral gear according to a second embodiment of the present invention.

FIG. 4 is a front view of a spiral gear according to a second embodiment of the present invention. Referring to FIG. 4, the spiral gear according to the second embodiment of the present invention differs from the spiral gear according to the first embodiment in that a plurality of through holes are provided at the outer circumferential face of a boss section 1011. Spiral gear 1010 of the second embodiment is provided with a through hole 122 in slit form at disk section 12, based on a configuration of changing the compliance of the gear to reduce noise, through laser processing after quenching. A power transmission system that transmits power by the engagement of gears will cause disturbing noise by the transmission of the compelling force generated by the engagement in the form of vibration. Although the precision of the tooth flank is conventionally regulated in the order of several μm for the purpose of reducing the compelling force generated by engagement, it was difficult to achieve strict regulation thereof unless tooth flank processing is conducted subsequent to quenching. There was difficulty in terms of production.

It is to be noted that the present invention has through hole 122 in slit form provided at disk section 12. By modifying the dynamic rigidity of spiral gear 1010 by means of through hole 122, the compliance (frequency response of displacement) of spiral gear 1010 per se can be altered to allow reduction of noise caused by engagement.

This through hole 122 is formed by laser processing after the quenching step. If a hole is formed prior to the quenching step, the shape of the hole will become complicated to increase variation in the distortion during quenching. This induces the problem of degrading the precision of the tooth flank. The usage of laser processing allows post-quenching processing, suppressing degradation in the precision of the tooth flank.

A slit form can be worked by scanning a laser beam. Since an arbitrary slit form can be achieved by just altering the scan of a laser beam, the degree of freedom is high. An optimum shape for each gear can be embodied. Further, vibration can be reduced in a manner similar to that of forming an elongated hole by properly selecting the position of the slit. Therefore, the time required for processing can be reduced as compared to case where a hole form is taken.

Figure 5:
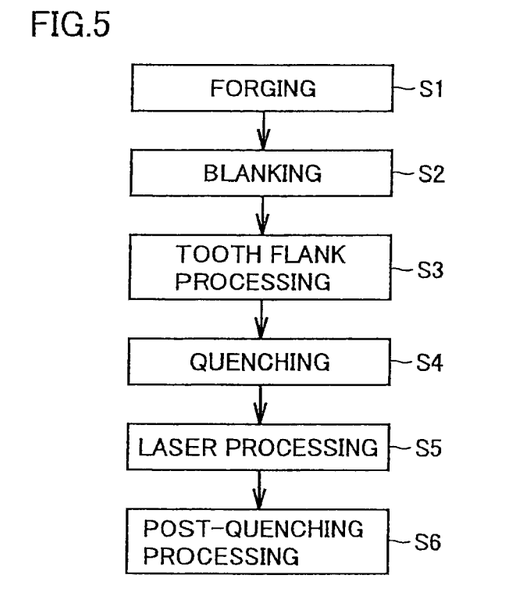
FIG. 5 is a block diagram representing the processing steps of a gear.

FIG. 5 is a block diagram of the processing steps of a gear. First, generally steel is forged (step S1).

Then, blanking (step S2), tooth flank processing (step S3), and quenching (step S4) are carried out, followed by laser processing (step S5). By laser processing, through hole 122 is drilled. After completion of the laser processing, post-quenching processing is carried out (step S6).

The fabrication method of a power transmission device according to the second embodiment of the present invention is directed to a fabrication method of a power transmission device transmitting power from a power source via a spiral gear 1010 including a disk section 12 extending radially outwards from boss section 1011. The fabrication method includes the steps of quenching at least spiral gear 1010, drilling through hole 122 in slit form in disk section 12 by laser processing after quenching; and carrying out post-quenching processing on spiral gear 1010 after through hole 122 is formed.

Figure 6:
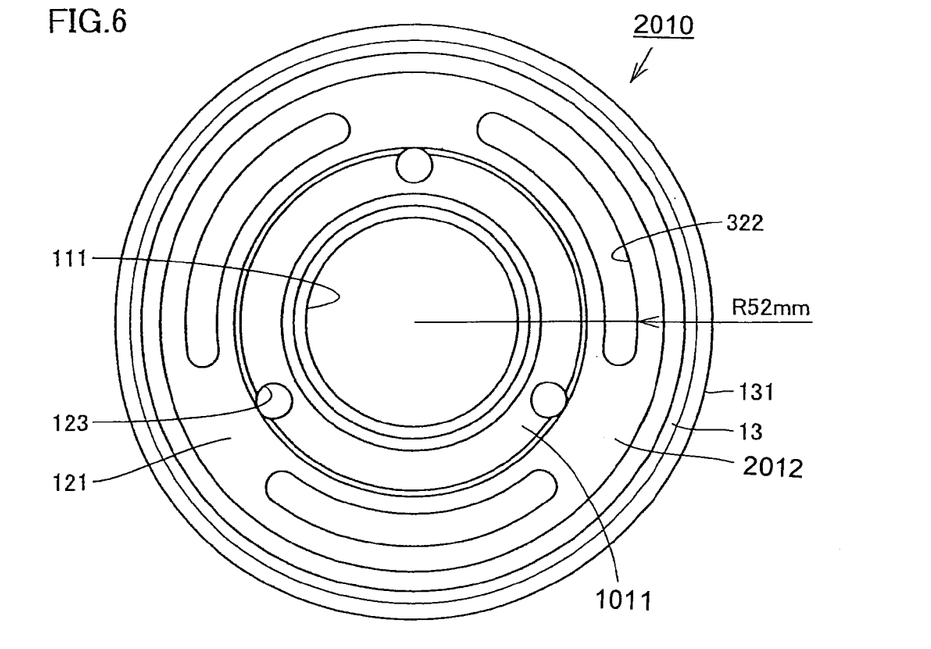
FIG. 6 is a front view of a spiral gear having a hole 322 that does not take the form of a slit.
Figure 7:
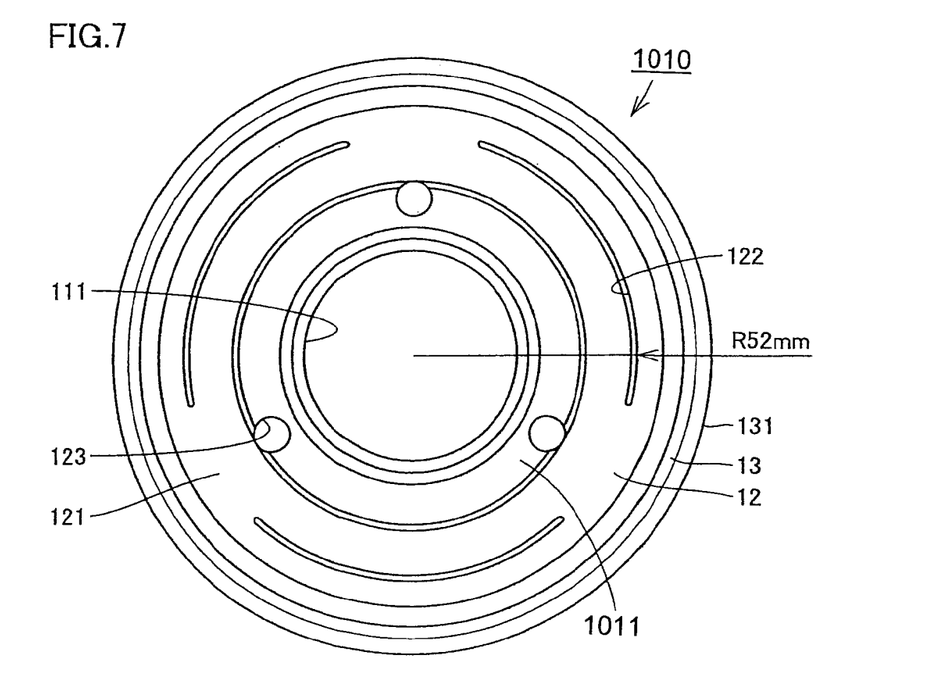
FIG. 7 is a front view of a spiral gear having a through hole 122 in slit form.

The effect of reducing noise at a spiral gear according to the present invention will be described hereinafter. A spiral gear 1010 having a through hole 122 in slit form according to the present invention, a spiral gear 2010 having a through hole not in slit form, and a spiral gear absent of a through hole were prepared. FIG. 6 is a front view of a spiral gear 2010 having a through hole 122 not in slit form, and FIG. 7 is a front view of a spiral gear 1010 having a through hole 122 in slit form. The dimension of such spiral gears is substantially the same as that of the spiral gear absent of a through hole, provided that the width of through hole 122 differs in the radial direction. The through hole in slit form has a width that can be achieved only by laser scanning, corresponding to through hole 122 drilled by laser processing. In the present embodiment, through hole 322 not in slit form formed in a disk section 2012 of gear 2010 and through hole 122 in slit form are located 52 mm from the center of the plane of spiral gears 1010 and 2010, respectively, in the radial direction.

Figure 8:
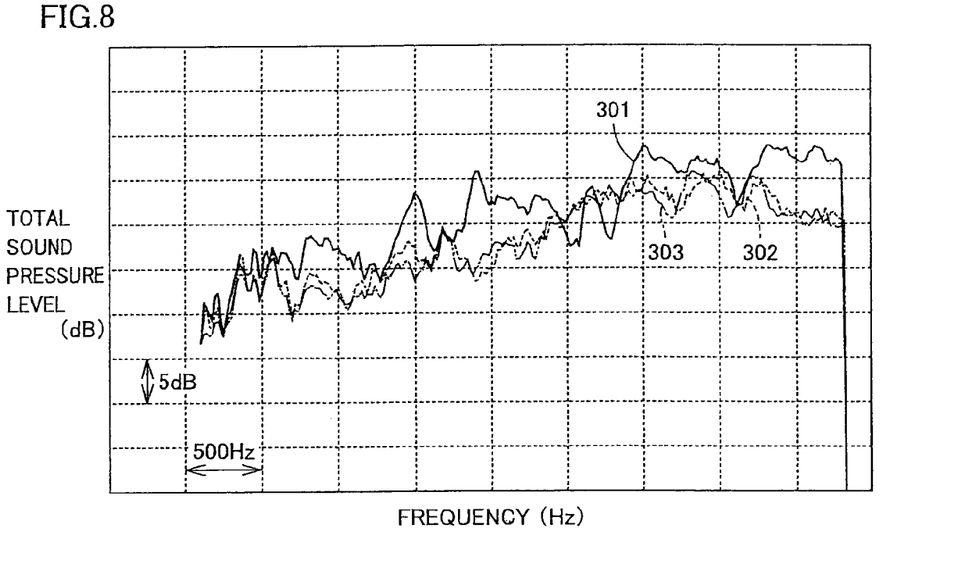
FIG. 8 is a graph representing the relationship between the frequency and total sound pressure level for each sample.

Based on these three types of spiral gears, the level of noise generation at respective frequencies was examined. The results are shown in FIG. 8. In FIG. 8, the relationship between the frequency and the total sound pressure level is represented by a solid line 301 for a spiral gear absent of a through hole, by a dotted line 302 for the spiral gear of FIG. 7, and by a two-dot chain line 303 for the spiral gear of the present invention shown in FIG. 6. It is appreciated from FIG. 8 that the total sound pressure level of the spiral gear according to the present invention (two-dot chain line 303) is lower than the total sound pressure level of the spiral gear corresponding to solid line 301. It is further appreciated that the spiral gear of the present invention exhibits the effect of noise reduction of a level identical to that of the sample with a hole corresponding to dotted line 302.

Third Embodiment

Figure 9:
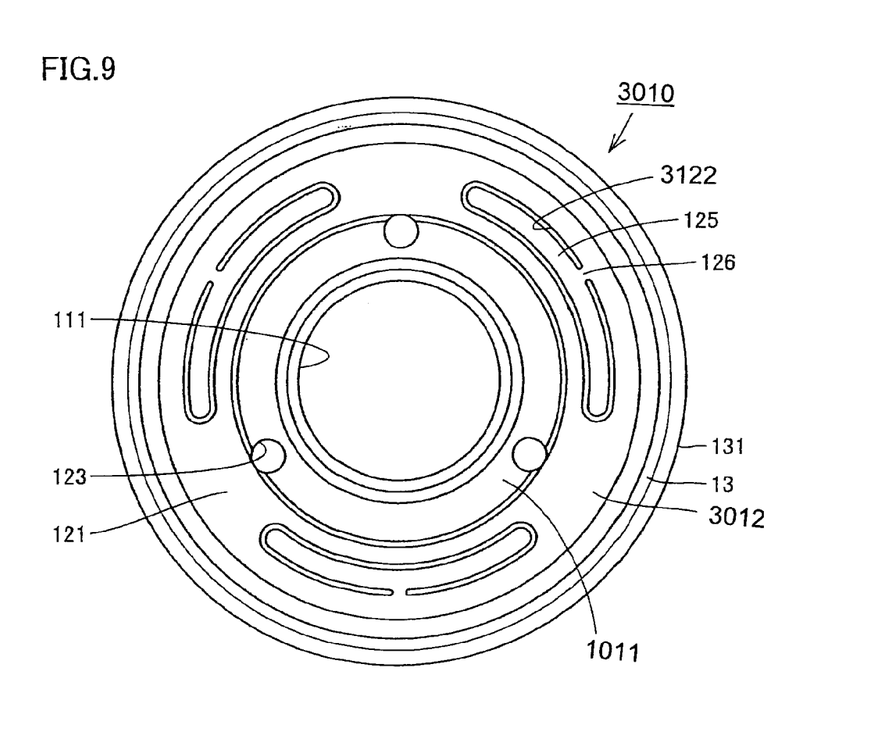
FIG. 9 is a front view of a spiral gear according to a third embodiment of the present invention.

FIG. 9 is a front view of a spiral gear according to a third embodiment of the present invention. Referring to FIG. 9, a spiral gear 3010 according to the third embodiment of the present invention differs from the spiral gear of the first embodiment in that a through hole 3122 takes a C shape. Through hole 3122 is formed in a disk section 3012 of gear 3010 of a configuration allowed with a single stroke so as to enclose an inner region 125. Inner region 125 is continuous with the outer region by a cut-left-over section 126. Although cut-left-over section 126 is provided at the outer circumferential side of inner region 125, cut-left-over section 126 may be provided at the inner circumferential side. Further, cut-left-over section 126 may be provided at the end in the circumferential direction.

Further, although three cut-left-over sections 126 are provided in the third embodiment, the number of cut-left-over sections 126 is not limited thereto. One or a plurality of cut-left-over sections 126 may be provided.

Further, each inner region 125 is not limited to a symmetrical shape, and a plurality of inner regions 125 in asymmetric form may be provided.

Specifically, a damper configuration is provided at disk section 3012 through laser processing after quenching as a configuration of altering the compliance of the spiral gear and reducing noise by the vibration reduction effect due to the damper. Inner region 125 of the damper configuration has a natural frequency different from that of the body of spiral gear 3010 to play the role of attenuating vibration at spiral gear 3010.

Figure 10:
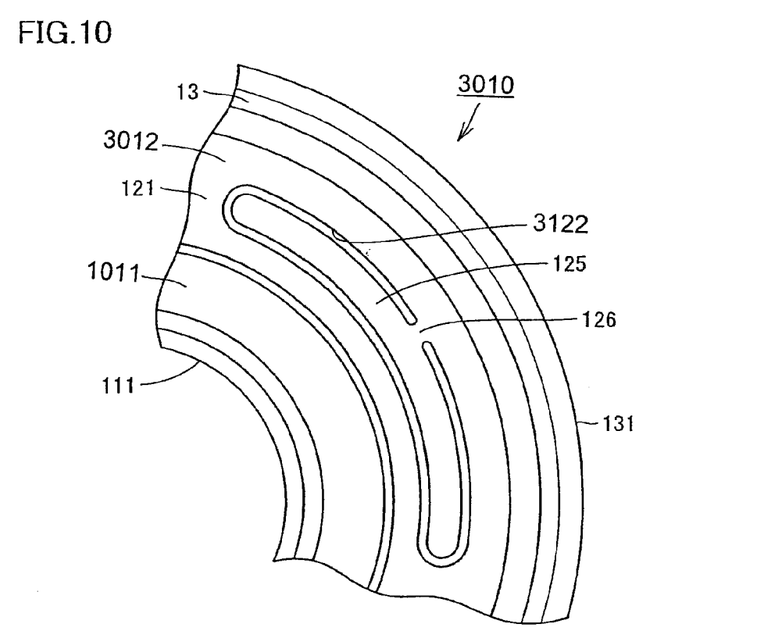
FIG. 10 is a front view of a cut-left-over section of FIG. 9 in an enlarged manner.

FIG. 10 is a front view of the cut-left-over section of FIG. 9 in an enlarged manner. Referring to FIG. 10, cut-left-over section 126 is the boundary region between inner region 125 and the outer region, having strength of a level allowing independent vibration of inner region 125. In other words, if the width of cut-left-over section 126 in the circumferential direction is increased, inner region 125 will be connected firmly to other regions, so that the damper effect by inner region 125 cannot be achieved. Further, if cut-left-over section 126 is too small, the strength of cut-left-over section 126 will be insufficient, leading to the possibility of inner region 126 dropping off.

In the present embodiment, the vibration reduction effect can be achieved by means of the damper due to the inner region connected through the cut-left-over section, in addition to the effect of drilling a complete through hole 3122 (altering the compliance of the gear).

Fourth Embodiment

Figure 11:
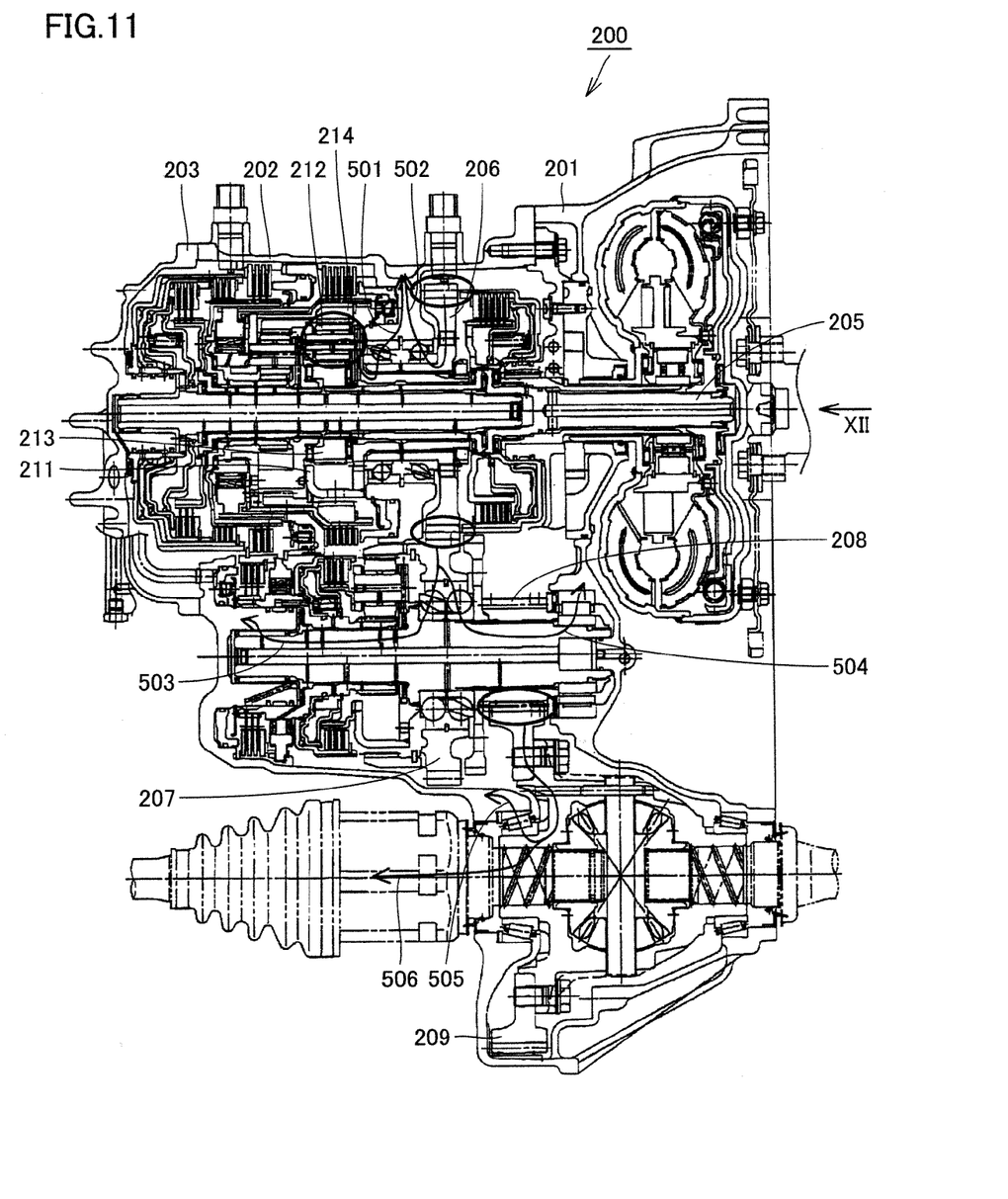
FIG. 11 is a sectional view of a power transmission device according to a fourth embodiment of the present invention.

FIG. 11 is a sectional view of a power transmission device according to a fourth embodiment of the present invention. Referring to FIG. 11, an automatic transmission 200 qualified as the power transmission device according to the fourth embodiment of the present invention includes power transmission components stored in a transaxle housing 201, a transaxle case 202, and a transaxle rear cover 203. An input shaft 205 is placed in transaxle housing 201. Input shaft 205 has power transmitted from a torque converter to transmit this power towards automatic transmission 200. A gear train is placed in transaxle case 202. For example, a planetary gear 212 engages with a sungear 213 and a ring gear 214. Planetary gear 212, sungear 213 and ring gear 214 constitute a planetary gearset.

A counter drive gear 206 is placed in transaxle case 202. Counter drive gear 206 engages with a counter driven gear 207. The power transmitted to counter driven gear 207 is provided to a differential drive pinion 208. Differential drive pinion 208 engages with ring gear 209 of the differential gear.

In automatic transmission 200 shown in FIG. 11, vibration is conveyed to the case or drive shaft as indicated by arrows 501-506. In order to cut off such transmission of vibration, a through hole in slit form shown in the first to third embodiments is provided. By forming a through hole in counter drive gear 206, for example, transmission of vibration in the direction indicated by arrow 502 can be mainly suppressed. Further, by forming a through hole in counter driven gear 207, mainly the transmission of vibration in the direction indicated by arrows 503 and 504 can be suppressed.

Further, by forming a through hole in ring gear 209, mainly the transmission of vibration in the direction indicated by arrows 505 and 506 can be suppressed.

In addition, by forming a through hole in slit form in planetary gear carrier 211, mainly the transmission of vibration in the direction indicated by arrow 501 can be suppressed.

Figure 12:
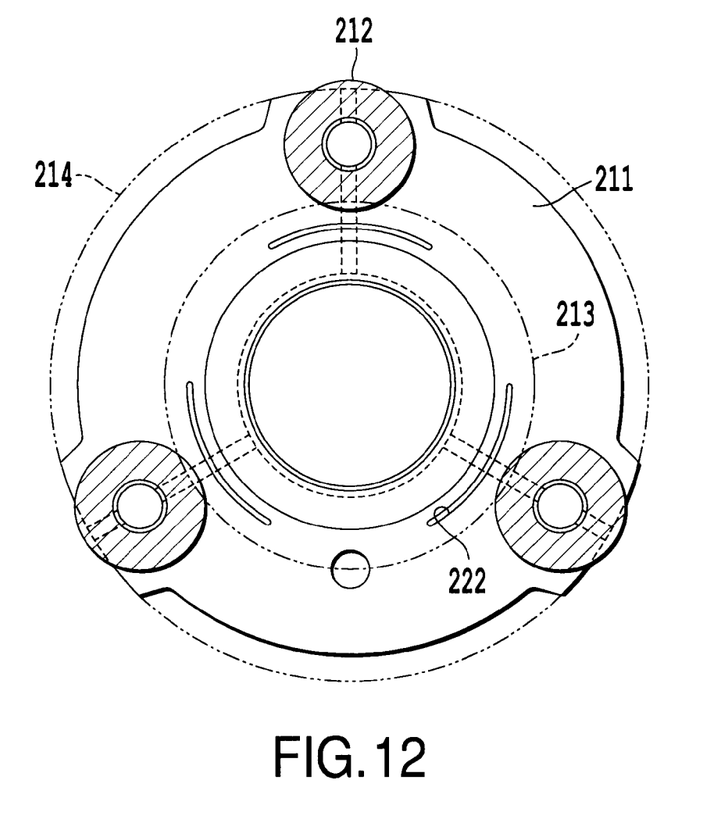
FIG. 12 is a front view of a planetary gear carrier viewed from a direction indicated by arrow XII of FIG. 11.

FIG. 12 is a front view of a planetary gear carrier when viewed from the direction indicated by arrow XII in FIG. 11. Referring to FIG. 12, planetary gear carrier 211 constituting the planetary gearset has a plurality of through holes 222 in slit form. Although through holes 222 are provided at three sites evenly spaced apart in the circumferential direction in the present embodiment, the arranged position and number of through holes 22 are not limited thereto. More or fewer through holes 222 may be provided.

Planetary gear carrier 211 holds planetary gear 212 allowing rotation in an orbital motion and rotary motion on its axis. Planetary gear 212 engages with sungear 213 at the inner circumferential side, and engages with ring gear 214 at the outer circumferential side. Planetary gear 212 engages with sungear 213 and ring gear 214, generating force in the axial direction by the transmission of the rotary torque. Although this axial force is transmitted to planetary gear carrier 211, this transmission of axial force will be alleviated at through hole 222 provided in slit form at planetary gear carrier 211. As a result, vibration in the axial direction can be suppressed. In other words, the power transmission system is automatic transmission 100 incorporated in a vehicle, and the rotation member is planetary gear carrier 211 provided in the automatic transmission.

In the fourth embodiment, the through hole in slit form is provided in a component disposed on the vibration transmission path. By providing a hole in slit form in a component located on the transmission path of vibration generated by the compelling force of the gear, the vibration characteristics of the component can be altered to suppress transmission of vibration. For example, a hole in slit form is provided at the support section of the counter drive gear bearing, the planetary gear carrier, and the like. Further, the slit form can be worked by laser beam scanning. Since an arbitrary slit shape can be achieved by just altering the scanning of the laser beam, the degree of freedom is high. An optimum configuration corresponding to the site can be embodied. Further, the slit shape allows embodiment even for components that are limited in space, as compared to drilling a hole.

Further, a material directed to attenuating vibration may be embedded in the slit section. For example, material such as resin having a vibration attenuation effect can be embedded for the slit section to achieve attenuation affirmatively.

Fifth Embodiment

Figure 13:
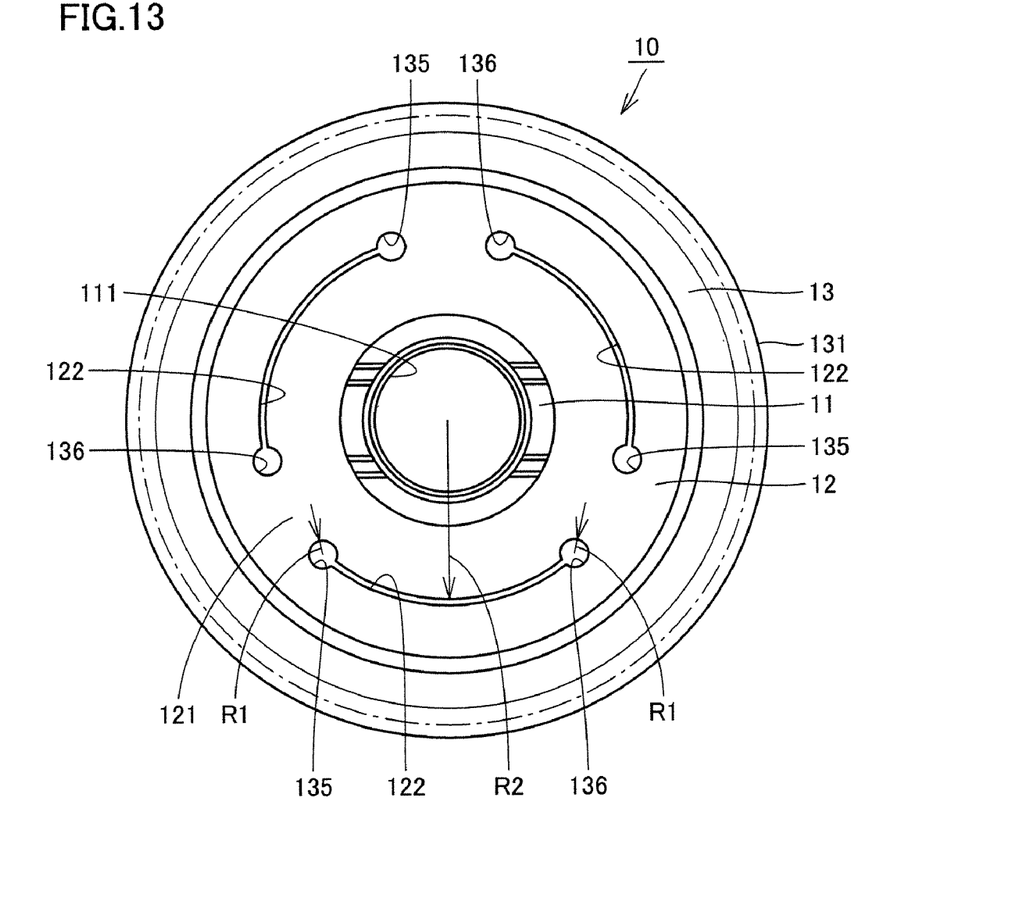
FIG. 13 is a plan view of a spiral gear according to a fifth embodiment of the present invention.

FIG. 13 is a plan view of a spiral gear according to a fifth embodiment of the present invention. Referring to FIG. 13, spiral gear 4010 according to the fifth embodiment of the present invention has a plurality of through holes 4122 provided at a disk section 4012 as a hole in slit form. Through holes 135 and 136 of substantially a circular shape are formed at respective ends of a through hole 4122. Through holes 135 and 136 each have an equal inner diameter of R1. Through hole 4122 in slit form is located at the area where the radial length from the center is R2, and takes an arc shape uniting through holes 135 and 136. The reason why through holes 135 and 136 are provided at respective ends of through hole 4122 in slit form is due to the fact that a certain degree of radius is required at the corner in order to avoid stress concentration. Although through holes 135 and 136 are provided at respective ends of through hole 4122 in the present embodiment, another through hole may be provided during the running course of through hole 4122 other than at respective ends.

Figure 14:
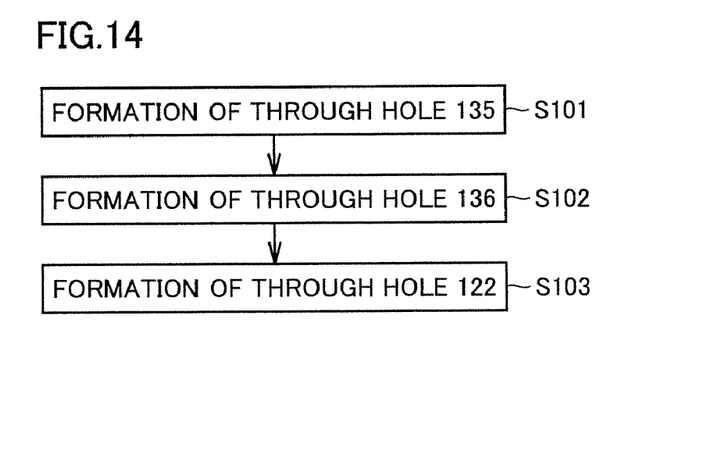
FIG. 14 is a block diagram of fabrication steps of the through hole shown in FIG. 13.

A fabrication method of a through hole in the spiral gear shown in FIG. 13 will be described hereinafter. FIG. 14 is a block diagram of the fabrication steps of the through hole of FIG. 13. Referring to FIG. 14, first a through hole 135 is formed. At this stage, disk section 4012 is subjected to laser processing to punch out a section so that the radius of through hole 135 is R1 (step S101).

Then, another through hole 136 is formed at a position distant from through hole 135. Disk section 4012 is subjected to laser processing to punch out a section so that the radius of through hole 136 is also R1 (step S102).

Finally, through hole 4122 in slit form is produced in a manner so as to unite through holes 135 and 136. When through hole 4122 in slit form is to be drilled, the laser focus is moved from through hole 135 towards through hole 136 by means of laser to form through hole 4122. It is not necessary to move the laser back and forth at this stage. The focused laser beam needs to be moved from through hole 135 towards through hole 136 only once (step S103).

The order of steps S101 to S103 is arbitrary. In other words, the order of the process carried out in the sequence of steps S101, S102 and S103 in FIG. 14 is not limited thereto. Any of steps S101 to S103 may be carried out first or may be carried out last. In other words, the process may be carried out in the order of steps S101, S103, and S102, in the order of steps S102, S101, and S103, in the order of steps S102, S103, and S101, in the order of steps S103, S101, and S102, or in the order of steps S103, S102 and S101, other than the sequence shown in FIG. 14.

Figure 15:
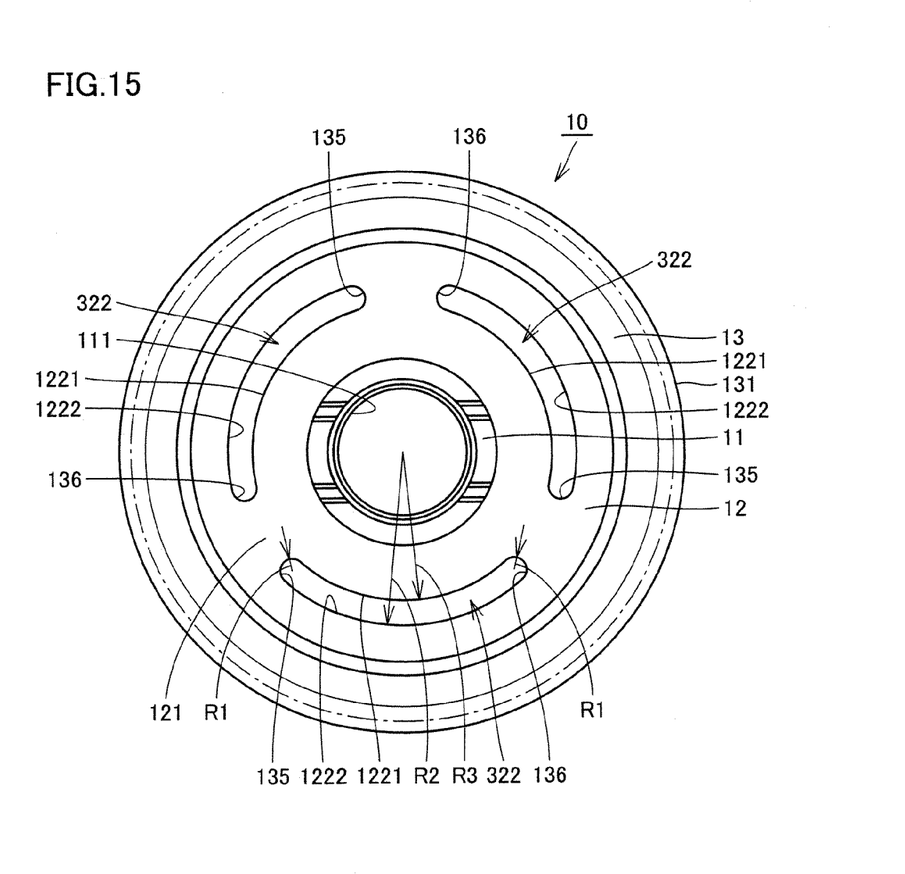
FIG. 15 is a plan view of a spiral gear according to a comparison example.

FIG. 15 is a plan view of a spiral gear according to a comparison example. Referring to FIG. 15, a spiral gear 5010 has a hole 322 not in slit form formed in a disk section 5012. An inner circumferential face 1221 and an outer circumferential face 1222 of hole 322 not in slit form correspond to radiuses R3 and R2, respectively, differing from each other. Through holes 135 and 136 are provided at respective ends of hole 322. Since a hole in slit form is not provided in spiral gear 5010 of the comparison example, outer circumferential face 1222 of radius R2 and inner circumferential face 1221 of radius R3 must be worked separately, inducing the problem of increasing fabrication steps.

In other words, the fabrication method of spiral gear 4010 qualified as the power transmission device according to the fifth embodiment is constituted of a first step of forming a through hole 135 at an end of a slit, a second step of forming a through hole 136 at the other end of the slit, and a third step with the center of area of through hole 135 formed at the first step as the start point and the center of area of through hole 136 formed at the second step as the end point. The fabrication method includes the steps of forming through holes 135 and 136 spaced apart from each other, and forming through hole 4122 in arc-slit form to unite through holes 135 and 136. The slit form of through hole 4122 is not limited to an arc, and may be straight. Further, the radius does not have to be constant even when taking a curved form.

In another process, through hole 4122 in slit form can be formed first, followed by formation of through holes 135 and 136 at respective ends.

Further, one of through holes 135 and 136 can be formed, followed by formation of through hole 4122 in slit form, and then formation of the other of through holes 135 and 136.

Figure 16:
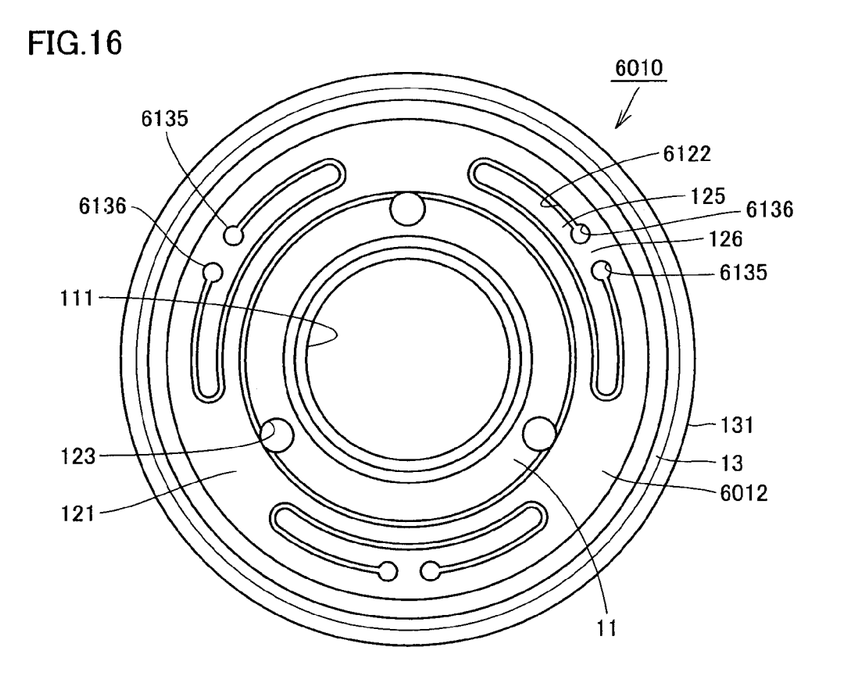
FIG. 16 is a plan view of a spiral gear that combines the examples illustrated in FIGS. 9 and 13.

FIG. 16 is a plan view of a spiral gear that combines the examples illustrated in FIGS. 9 and 13. Referring to FIG. 16, spiral gear 6010 has a plurality of through holes 6122 provided at disk section 6012 as hole in slit form that have a C shape. Through holes 6135 and 6136 of substantially a circular shape are formed at respective ends of a through hole 6122. Through holes 6135 and 6136 each have an equal inner diameter of R1. Through hole 6122 is in slit form and has a C shape.

Embodiments of the present invention set forth above may be subjected to various modifications. The power transmission mechanism to which the present invention is applied is not limited to an automatic transmission, and may be a manual transmission, continuously variable transmission, differential gear, power slit device, or a hub device with a reduction feature.

Further, the present invention is applicable to a power transmission mechanism of an engine of either a longitudinal engine layout or transverse engine layout.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A power transmission device that transmits power from a power source via a rotation member that rotates about a predetermined shaft center, the power transmission device comprising:
the rotation member, the rotation member including
a rim section that includes a plurality of teeth,
a boss section, and
a disk section extending radially outwards from the boss section to the rim section, the disk section including a plurality of holes in slit form that are formed by being drilled by laser processing, at least one of the holes in slit form having a C shape that defines an inner region of the disk section that is partially enclosed by the at least one of the holes such that an outer region of the disk section that is outside of the at least one of the holes is continuous with the inner region of the disk section via a cut-left-over section of the disk, and a length of a connecting region between the plurality of holes is shorter than a length of the at least one hole.

2. The power transmission device according to claim 1, wherein the power transmission device is a transmission provided in a vehicle, and the rotation member is a rotation member provided in the transmission.

3. The power transmission device according to claim 1, wherein the disk section is thinner than the rim section in an axial direction of the rotation member.

4. The power transmission device according to claim 1, wherein the at least one of the holes that has the C shape includes a first portion that extends in a circumferential direction of the rotation member, a second portion that extends in the circumferential direction of the rotation member and that is offset from the first portion in a radial direction of the rotation member, and a third portion that connects the first portion to the second portion.

5. The power transmission device according to claim 4, wherein the cut-left-over section is provided at an outer circumferential side of the inner region.

6. The power transmission device according to claim 4, wherein the cut-left-over section is provided at an inner circumferential side of the inner region.

7. The power transmission device according to claim 4, wherein the cut-left-over section is provided at an end of the inner region in the circumferential direction.

8. A fabrication method of a power transmission device that transmits power from a power source via a rotation member that rotates about a predetermined shaft center, the rotation member including a disk section extending radially outwards from a boss section to a rim section that supports a plurality of teeth, comprising:

forming a hole in slit form in the disk section by
drilling a first through hole by laser processing in the disk section so as to form a first end of said slit,
drilling a second through hole by laser processing in the disk section that is offset from the first hole in a circumferential direction of the rotation member so as to form a second end of said slit, and
drilling a slit by laser processing that connects the first through hole to the second through hole by using a center of area of the first through hole as a start point and a center of area of the second through hole as an end point, the slit that connects the first through hole to the second through hole having a C shape that defines an inner region of the disk section that is partially enclosed by the hole in slit form such that an outer region of the disk section that is outside of the hole in slit form is continuous with the inner region of the disk section via a cut-left-over section of the disk.

9. The fabrication method of a power transmission device according to claim 8, wherein the slit that has the C shape includes a first portion that extends in a circumferential direction of the rotation member, a second portion that extends in the circumferential direction of the rotation member and that is offset from the first portion in a radial direction of the rotation member, and a third portion that connects the first portion to the second portion.

10. The power transmission device according to claim 9, wherein the cut-left-over section is provided at an outer circumferential side of the inner region.

11. The power transmission device according to claim 9, wherein the cut-left-over section is provided at an inner circumferential side of the inner region.

12. The power transmission device according to claim 9, wherein the cut-left-over section is provided at an end of the inner region in the circumferential direction.

13. A fabrication method of a power transmission device that transmits power from a power source via a rotation member including a disk section extending radially outwards from a boss section to a rim section that supports a plurality of teeth, the fabrication method comprising:
quenching at least a rotation member; and
drilling a hole in slit form at the disk section through laser processing after quenching, the hole in slit form having a C shape that defines an inner region of the disk section that is partially enclosed by the hole in slit form such that an outer region of the disk section that is outside of the hole in slit form is continuous with the inner region of the disk section via a cut-left-over section of the disk.

14. The fabrication method of a power transmission device according to claim 13, wherein the hole in slit form that has the C shape includes a first portion that extends in a circumferential direction of the rotation member, a second portion that extends in the circumferential direction of the rotation member and that is offset from the first portion in a radial direction of the rotation member, and a third portion that connects the first portion to the second portion.

15. The power transmission device according to claim 14, wherein the cut-left-over section is provided at an outer circumferential side of the inner region.

16. The power transmission device according to claim 14, wherein the cut-left-over section is provided at an inner circumferential side of the inner region.

17. The power transmission device according to claim 14, wherein the cut-left-over section is provided at an end of the inner region in the circumferential direction.

* * * * *